United States Patent
Takemura

(10) Patent No.: US 12,316,373 B2
(45) Date of Patent: May 27, 2025

(54) OPTICAL SIGNAL MONITORING DEVICE, AND OPTICAL SIGNAL MONITORING METHOD

(71) Applicant: NEC Corporation, Tokyo (JP)

(72) Inventor: Takeshi Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 18/007,507

(22) PCT Filed: Jun. 3, 2020

(86) PCT No.: PCT/JP2020/021972
§ 371 (c)(1),
(2) Date: Dec. 1, 2022

(87) PCT Pub. No.: WO2021/245847
PCT Pub. Date: Dec. 9, 2021

(65) Prior Publication Data
US 2023/0268994 A1     Aug. 24, 2023

(51) Int. Cl.
*H04B 10/079* (2013.01)
*H04B 10/077* (2013.01)
*H04J 14/02* (2006.01)

(52) U.S. Cl.
CPC ... *H04B 10/07955* (2013.01); *H04B 10/0775* (2013.01); *H04B 10/07957* (2013.01); *H04J 14/02* (2013.01); *H04J 14/0272* (2013.01)

(58) Field of Classification Search
CPC ........ H04B 10/07955; H04B 10/07957; H04B 10/0775; H04J 14/02; H04J 14/0272
(Continued)

(56) References Cited

U.S. PATENT DOCUMENTS 11,196,504 B1 * 12/2021 Frankel ............... H04J 14/0224
2002/0167245 A1 * 11/2002 Hung .................... G02B 6/3588
310/309

(Continued)

FOREIGN PATENT DOCUMENTS

CN        1288172 A   *  3/2001   ......... H04B 10/2942
CN      103036843 B   *  5/2016
JP      2016-523025 A     8/2016

OTHER PUBLICATIONS

International Search Report for PCT Application No. PCT/JP2020/021972, mailed on Aug. 4, 2020.
(Continued)

*Primary Examiner* — Abbas H Alagheband
(74) *Attorney, Agent, or Firm* — Sughrue Mion, PLLC

(57) ABSTRACT

Since safe utilization of an optical transmission system is impaired if a system is adopted in which a wavelength band is divided into sub-bands and a different user is allocated to each sub-band, the optical signal monitoring device of the present invention includes: an optical signal information generating means for monitoring wavelength multiplexed signal light comprising sub-band optical signals belonging to each of a plurality of sub-bands classified by means of identification information, and generating wavelength multiplexed signal information including optical power information of each wavelength in the wavelength multiplexed signal light; a sub-band signal information generating means for generating sub-band signal information associated with the identification information, for each of the plurality of sub-bands, on the basis of the wavelength multiplexed signal information; and a sub-band signal information control means for controlling the utilization of the sub-band signal information, on the basis of the identification information.

14 Claims, 5 Drawing Sheets

(58) Field of Classification Search
USPC .......................................................... 398/38
See application file for complete search history.

(56) References Cited

U.S. PATENT DOCUMENTS

| | | | | |
|---|---|---|---|---|
| 2003/0048508 A1* | 3/2003 | Yu | ........................ | H04B 10/506 |
| | | | | 398/91 |
| 2003/0219250 A1* | 11/2003 | Wein | .................... | H04B 10/077 |
| | | | | 398/26 |
| 2005/0024715 A1* | 2/2005 | Inoue | ................. | H04J 14/02212 |
| | | | | 359/337 |
| 2007/0098411 A1* | 5/2007 | Ghera | ................. | H04J 14/0297 |
| | | | | 398/177 |
| 2009/0324219 A1* | 12/2009 | Jiang | ................... | H04J 14/0227 |
| | | | | 398/34 |
| 2014/0286635 A1* | 9/2014 | Kaneko | ................ | H04B 10/506 |
| | | | | 398/34 |
| 2016/0164597 A1* | 6/2016 | Evans | .................... | H04Q 11/02 |
| | | | | 398/9 |
| 2016/0226617 A1* | 8/2016 | Muth | .................. | H04J 14/0221 |
| 2018/0069648 A1* | 3/2018 | Inada | .................. | H04B 10/073 |
| 2019/0074924 A1* | 3/2019 | Boertjes | .............. | H04J 14/0276 |
| 2020/0084209 A1* | 3/2020 | Kram | .................. | H04L 63/0876 |
| 2020/0358534 A1* | 11/2020 | Ootaki | ................. | H04B 10/572 |

OTHER PUBLICATIONS

English translation of Written opinion for PCT Application No. PCT/JP2020/021972, mailed on Aug. 4, 2020.

* cited by examiner

OPTICAL SIGNAL MONITORING DEVICE, AND OPTICAL SIGNAL MONITORING METHOD

This application is a National Stage Entry of PCT/JP2020/021972 filed on Jun. 3, 2020, the contents of all of which are incorporated herein by reference, in their entirety.

TECHNICAL FIELD

The present invention relates to an optical signal monitoring device and an optical signal monitoring method, and more specifically relates to an optical signal monitoring device and an optical signal monitoring method that are used for an optical transmission system based on a wavelength division multiplexing method.

BACKGROUND ART

Due to a worldwide increase in data traffic, a demand for capacity enlargement and long-distance achievement of an optical transmission system is increasing. Therefore, in a long-distance/large-capacity optical transmission system such as an optical submarine cable system, a wavelength division multiplexing (WDM) method is used.

With regard to an optical transmission system using a wavelength division multiplexing (WDM) method, in recent years, attention has been paid to an optical transmission system that divides a usage wavelength band of one optical fiber into a plurality of sub-bands and allocates a different customer (user) to each of the sub-bands. PTL 1 describes an example of such an optical transmission system using a sub-band allocated to a customer.

In a related WDM communication system described in PTL 1, a different portion of a system bandwidth is allocated to each different user. A transmission terminal constituting the related WDM communication system includes separate transmission sub-systems (n units) relevant to users and a user control unit (UCU) that generates a collection optical signal acquired by combining user identification collection signals of the users.

The user control unit (UCU) includes a transmission optical filter element (T-OFE), a variable optical attenuator (VOA), a controller, a loading power system, an optical channel monitor (OCM), and a power detector. The transmission optical filter element (T-OFE) includes one or more optical filtering devices. The optical filtering device limits an optical signal to be output to a user-allocated bandwidth of each user.

The controller responds to output of the optical channel monitor (OCM) and provides a transmission spectrum control output signal for the transmission optical filter element (T-OFE). The controller dynamically adjusts, based on the transmission spectrum control output signal, a wavelength filtering spectrum shape of the transmission optical filter element (T-OFE).

It is assumed that such a configuration is made and thereby, according to the related WDM communication system, a user channel or a wavelength outside a user-allocated bandwidth can be prevented from being coupled with a collection output signal.

CITATION LIST

Patent Literature

[PTL 1] Japanese Translation of PCT International Application Publication No. 2016-523025

SUMMARY OF INVENTION

Technical Problem

In an optical transmission system using a wavelength division multiplexing (WDM) method, wavelength multiplexed signal light is monitored by using an optical channel monitor (OCM). In the optical transmission system, with regard to all sub-bands included in a usage wavelength band of a fiber, wavelength multiplexed signal light is monitored and wavelength multiplexed signal information is acquired.

In contrast, in an optical transmission system that allocates a different customer (user) to each sub-band as in the above-described related WDM communication system, a device (a transponder or the like) that transmits/receives an optical signal in an allocated sub-band is managed by each user. Therefore, it is desirable for each user to remotely monitor wavelength multiplexed signal light in a user-side facility where a transponder or the like is installed.

In this case, each user may remotely use a monitoring result of an optical channel monitor included in an optical transmission system. However, the monitoring result of the optical channel monitor includes wavelength multiplexed signal information with respect to all sub-bands, and therefore, signal information of each user is disclosed to another user who transmits/receives an optical signal by using another sub-band. As a result, safe usage of the optical transmission system is impaired.

There is a problem that, when a method of dividing a wavelength band into sub-bands and allocating a different user to each of the sub-bands is employed in this manner, safe usage of an optical transmission system is impaired.

An object of the present invention is to provide an optical signal monitoring device and an optical signal monitoring method that solve the above-described problem.

Solution to Problem

An optical signal monitoring device according to the present invention includes: an optical signal information generating means for monitoring wavelength multiplexed signal light including sub-band optical signals belonging to each of a plurality of sub-bands distinguished by identification information and generating wavelength multiplexed signal information including optical power information in each wavelength of the wavelength multiplexed signal light; a sub-band signal information generating means for generating, based on the wavelength multiplexed signal information, sub-band signal information associated with the identification information with respect to each of the plurality of sub-bands; and a sub-band signal information control means for controlling, based on the identification information, usage of the sub-band signal information.

An optical signal monitoring method according to the present invention includes: monitoring wavelength multiplexed signal light including sub-band optical signals belonging to each of a plurality of sub-bands distinguished by identification information; generating wavelength multiplexed signal information including optical power information in each wavelength of the wavelength multiplexed signal light; generating, based on the wavelength multiplexed signal information, sub-band signal information associated with the identification information with respect to each of the plurality of sub-bands; and controlling, based on the identification information, usage of the sub-band signal information.

Advantageous Effects of Invention

According to an optical signal monitoring device and an optical signal monitoring method of the present invention, even when a method of dividing a wavelength band into sub-bands and allocating a different user to each of the sub-bands is employed, safe usage of an optical transmission system is able to be achieved.

EXAMPLE EMBODIMENT

Hereinafter, with reference to the accompanying drawings, example embodiments of the present invention are described.

First Example Embodiment

Figure 1:
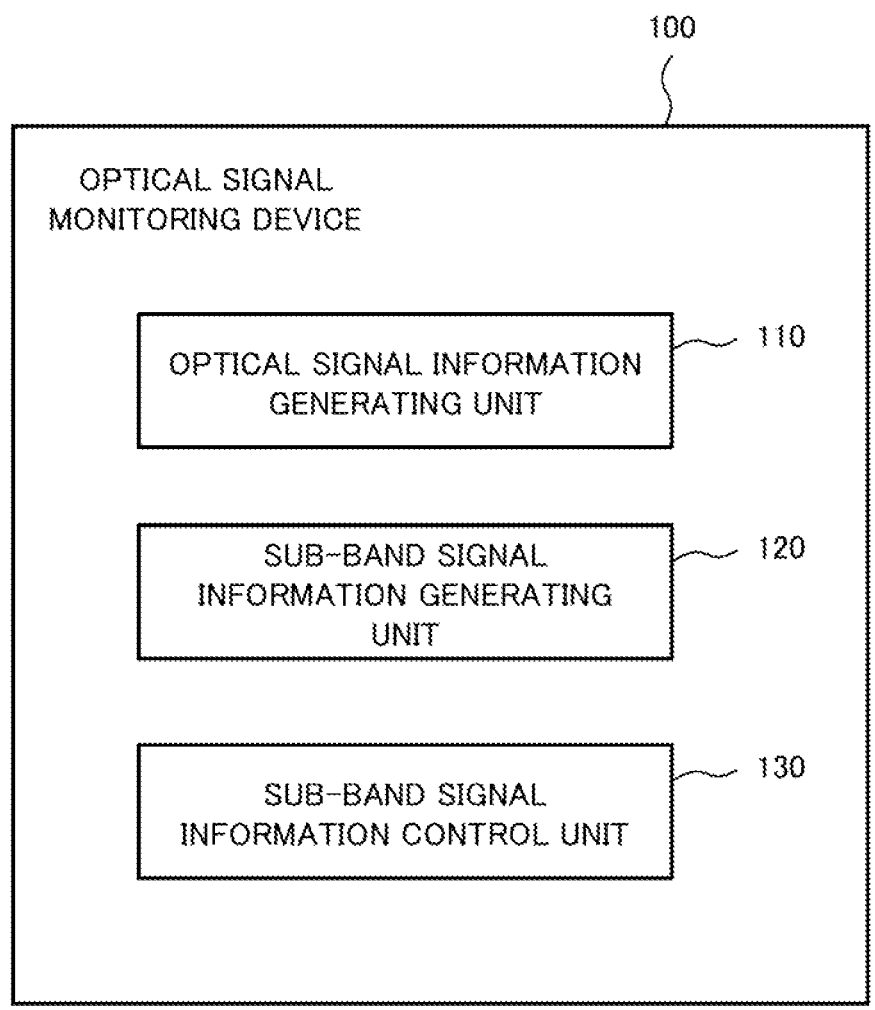
FIG. 1 is a block diagram illustrating a configuration of an optical signal monitoring device according to a first example embodiment of the present invention.

FIG. 1 is a block diagram illustrating a configuration of an optical signal monitoring device 100 according to a first example embodiment of the present invention. The optical signal monitoring device 100 includes an optical signal information generating unit (optical signal information generating means) 110, a sub-band signal information generating unit (sub-band signal information generating means) 120, and a sub-band signal information control unit (sub-band signal information control means) 130.

The optical signal information generating unit 110 monitors wavelength multiplexed signal light including sub-band optical signals belonging to each of a plurality of sub-bands distinguished by identification information and generates wavelength multiplexed signal information including optical power information in each wavelength of the wavelength multiplexed signal light. The sub-band signal information generating unit 120 generates, based on the wavelength multiplexed signal information, sub-band signal information associated with the identification information with respect to each of the plurality of sub-bands. The sub-band signal information control unit 130 controls, based on the identification information, usage of the sub-band signal information.

Figure 2:
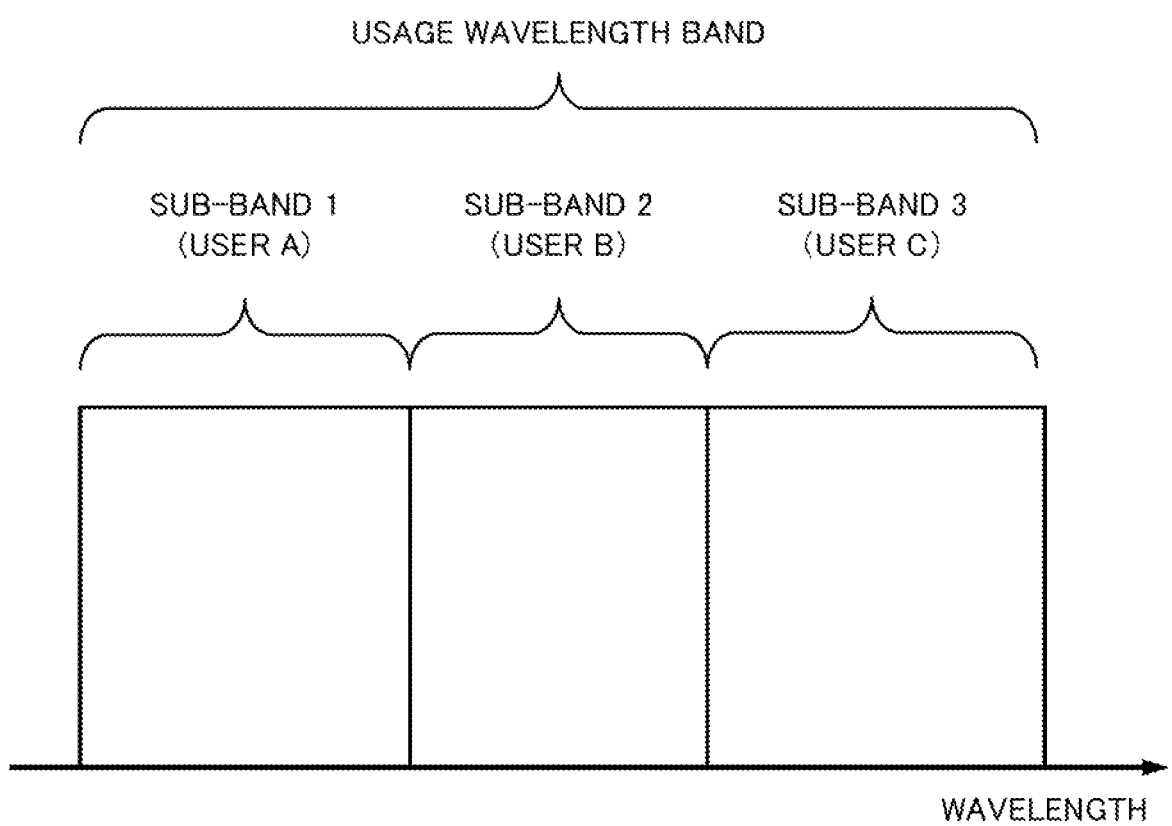
FIG. 2 is a diagram schematically illustrating a usage wavelength band of an optical transmission system using the optical signal monitoring device according to the first example embodiment of the present invention.

The optical signal monitoring device 100 according to the present example embodiment is used in an optical transmission system used by a plurality of customers (users) discriminated by identification information. In this case, the optical transmission system divides a usage wavelength band of one optical fiber into a plurality of sub-bands, allocates a different user to each of the sub-bands (spectrum sharing), and transmits an information signal of each of the users. FIG. 2 schematically illustrates an example in which a usage wavelength band is divided into three sub-bands and the three sub-bands are allocated to users A, B, and C different from each other.

As the optical signal information generating unit 110, typically, an optical channel monitor (OCM) is usable. As a method for optical channel monitoring, a method of sweeping an optical bandpass filter by using a wavelength slot, followed by electric conversion based on a photodetector, and measuring optical power in each wavelength is known.

As described above, in the optical signal monitoring device 100 according to the present example embodiment, the sub-band signal information control unit 130 is configured in such a way as to control, based on identification information, usage of sub-band signal information. Therefore, according to the optical signal monitoring device 100 of the present example embodiment, even when a method of dividing a wavelength band into sub-bands and allocating a different user to each of the sub-bands is employed, safe usage of an optical transmission system can be achieved.

Sub-band signal information generated by the sub-band signal information generating unit 120 includes at least either of sub-band optical power information relevant to sub-band optical power being optical power of a sub-band optical signal or warning information relevant to a variation in sub-band optical power.

The sub-band signal information control unit 130 can be configured in such a way as to respond to a request signal including an identifying code relevant to identification information and disclose, to a transmission source of the request signal, sub-band signal information associated with the identification information. Herein, when identification information is set as each of user names, for an identifying code, an identification (ID) number or the like previously determined with respect to each user is usable. A transmission source of a request signal can be, for example, an element management system (EMS) managed by each user.

The sub-band signal information generating unit 120 may generate sub-band signal information associated with identification information and authentication information. In this case, the sub-band signal information control unit 130 responds to a request signal including an identifying code relevant to identification information and an authentication code relevant to authentication information and discloses, to a transmission source of the request signal, sub-band signal information associated with the identification information and the authentication information. Herein, by using, as authentication information, a password such as a secret number and the like, an authentication code in which the password is coded is usable.

Figure 3:
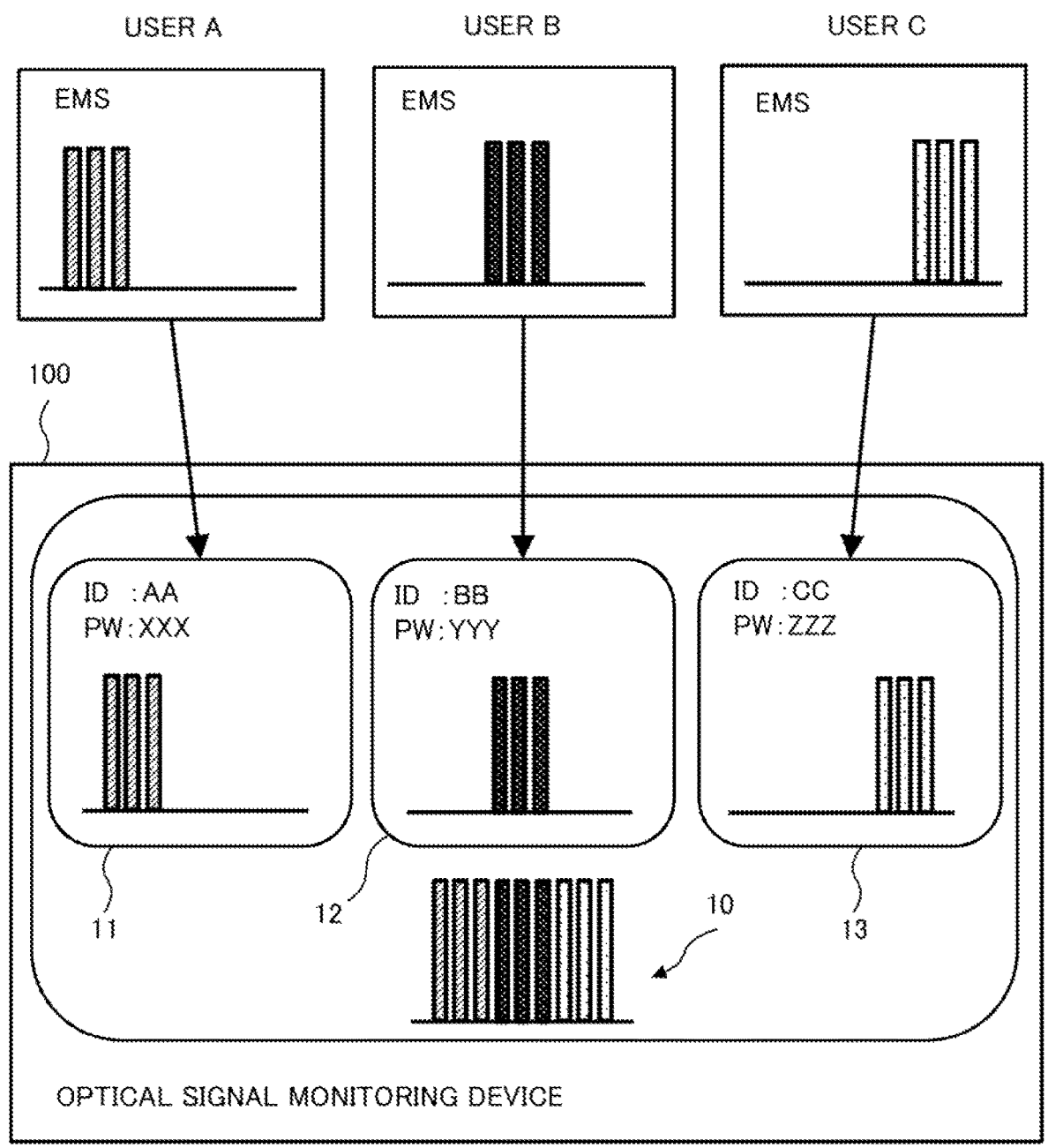
FIG. 3 is a diagram for illustrating an operation of the optical signal monitoring device according to the first example embodiment of the present invention.

FIG. 3 schematically illustrates an example in which the optical signal monitoring device 100 controls, by using an ID number and a password (PW), usage of sub-band signal information.

A usage wavelength band of an optical transmission system is divided into three sub-bands, the three sub-bands are allocated to users A, B, and C different from each other (see FIG. 2), and each user inserts a sub-band optical signal into a band for an allocated sub-band. The optical signal information generating unit 110 included in the optical signal monitoring device 100 generates wavelength multiplexed signal information 10 being optical power information in each wavelength of wavelength multiplexed signal light including sub-band optical signals. The sub-band signal information generating unit 120 generates, from the wavelength multiplexed signal information 10, pieces of sub-band signal information 11, 12, and 13 for sub-bands 1, 2, and 3, respectively.

Pieces of sub-band signal information 11, 12, and 13 generated by the sub-band signal information generating unit 120 are set with ID numbers (AA, BB, and CC) and passwords (XXX, YYY, and ZZZ) relevant to user names A, B, and C (identification information), respectively. The optical signal monitoring device 100 receives, from a device managed by a user, for example, an element management system (EMS), a request signal for reading sub-band signal information. The sub-band signal information control unit 130 determines whether an ID number and a password included in the request signal are matched with an ID number and a password previously determined with respect to each user. When the ID numbers are matched and the passwords are matched, the sub-band signal information control unit 130 transmits, to an element management system (EMS) or the like of a user being a transmission source of the request signal, only sub-band signal information with respect to each user associated with the ID number and the password. In contrast, when the ID numbers are not matched or the passwords are not matched, the sub-band signal information control unit 130 returns a reply indicating no good (NG).

Based on such an operation, the optical signal monitoring device 100 can perform control in such a way that sub-band signal information with respect to each user is not read by another user.

Figure 4:
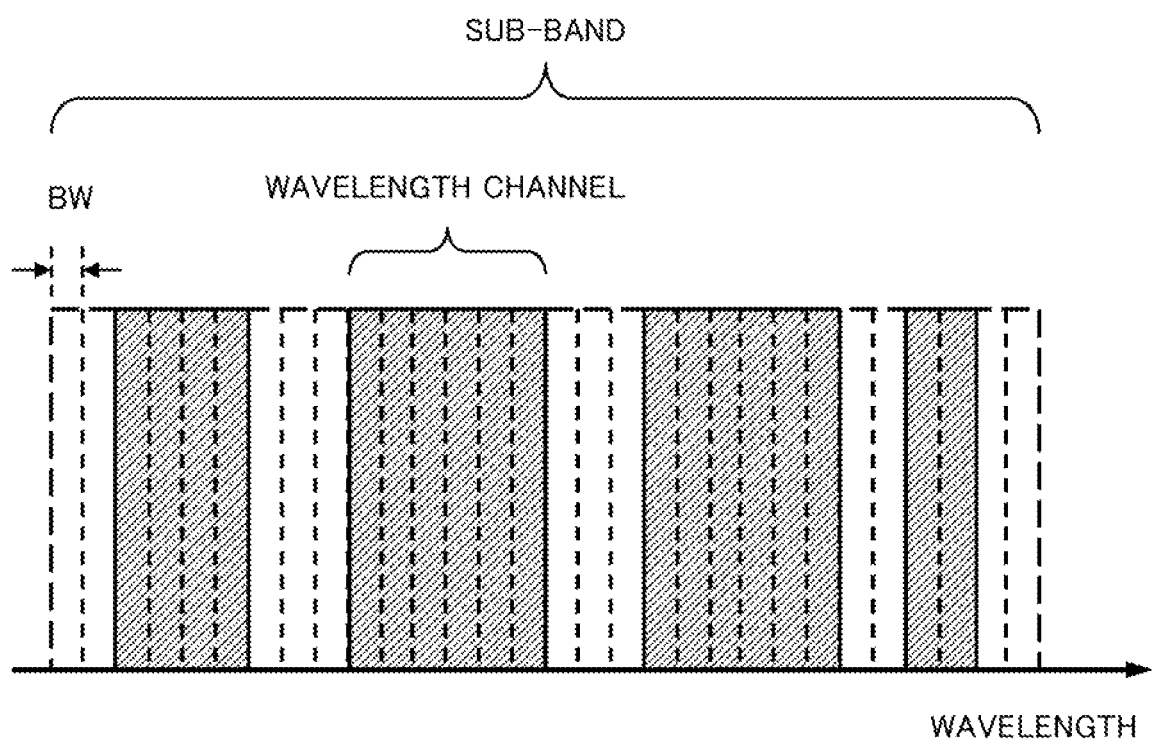
FIG. 4 is a diagram for illustrating an operation of the optical signal monitoring device according to the first example embodiment of the present invention and is a diagram schematically illustrating wavelength channels included in a sub-band.

FIG. 3 has exemplarily illustrated, as sub-band signal information, a sub-band optical spectrum being sub-band optical power information. Herein, the sub-band optical spectrum is a distribution for wavelengths of sub-band optical power. Without limitation thereto, as sub-band optical power information, channel optical power being an integrated value of sub-band optical power in wavelength channels included in a sub-band is usable. FIG. 4 schematically illustrates wavelength channels included in a sub-band. As sub-band optical power information, sub-band integration power being an integrated value of sub-band optical power in wavelengths included in a sub-band may be used. Herein, each integrated value is a value in which optical power measured with respect to each predetermined bandwidth BW (e.g., 6.25 GHz) is accumulated.

As sub-band optical power information, channel warning information indicating a variation in channel optical power being an integrated value of sub-band optical power in wavelength channels included in a sub-band is usable. A specific example in this case is described, as follows.

A user previously notifies the optical signal monitoring device 100 of an upper threshold and a lower threshold of channel optical power, together with optical signal information (a median frequency, a wavelength channel width, an ID number, and the like) in an allocated sub-bad. The optical signal monitoring device 100 notifies, when there is a variation in channel optical power, a device of a user, for example, an element management system (EMS) of the variation as warning information (alarm information). Specifically, the optical signal monitoring device 100 notifies, when channel optical power exceeds an upper threshold, an element management system (EMS) or the like of a user of "a channel high alarm" and notifies, when channel optical power falls below a lower threshold, an element management system (EMS) or the like of a user of "a channel low alarm". The optical signal monitoring device 100 may make, when channel optical power falls below an input break threshold (e.g., typically, −30 dBm), a notification of "a channel input break alarm".

As sub-band signal information, sub-band warning information indicating a variation in sub-band integration power being an integrated value of sub-band optical power in wavelengths included in a sub-band may be used. A specific example in this case is described, as follows.

A user previously notifies the optical signal monitoring device 100 of an upper threshold and a lower threshold of a sub-band integration power, together with optical signal information (a median frequency, a wavelength channel width, an ID number, and the like) in an allocated sub-bad. The optical signal monitoring device 100 notifies, when there is a variation in a sub-band integration power, a device, for example, an element management system (EMS) of a user of the variation as warning information (alarm information). Specifically, the optical signal monitoring device 100 notifies, when a sub-band integration power exceeds an upper threshold, an element management system (EMS) or the like of a user of "a sub-band high alarm" and notifies, when a sub-band integration power falls below a lower threshold, an element management system (EMS) or the like of a user of "a sub-band low alarm". The optical signal monitoring device 100 may make, when a sub-band integration power falls below an input break threshold (e.g., typically,−30 dBm), a notification of "a sub-band integration power input break alarm".

When the above-described configuration is employed, according to the optical signal monitoring device 100, sub-band signal information (sub-band optical power information or warning information) of a request source can be non-disclosed to another user other than the request source. As a result, even when a different user is allocated to each sub-band, safe usage of an optical transmission system can be achieved.

Next, an optical signal monitoring method according to the present example embodiment is described.

The optical signal monitoring method according to the present example embodiment first monitors wavelength multiplexed signal light including sub-band optical signals belonging to each of a plurality of sub-bands distinguished by identification information and generates wavelength multiplexed signal information including optical power information in each wavelength of the wavelength multiplexed signal light. Next, the method generates, based on the wavelength multiplexed signal information, sub-band signal information associated with the identification information with respect to each of the plurality of sub-bands. Next, the method controls, based on the identification information, usage of the sub-band signal information.

Controlling usage of sub-band signal information described above can be configured by including responding to a request signal including an identifying code relevant to identification information and disclosing, to a transmission source of the request signal, sub-band signal information associated with the identification information.

Generating sub-band signal information described above can be configured by including generating sub-band signal information associated with identification information and authentication information. In this case, controlling usage of sub-band signal information can be configured by including responding to a request signal including an identifying code relevant to identification information and an authentication code relevant to the authentication information and disclosing, to a transmission source of the request signal, the sub-band signal information associated with the identification information and the authentication information.

As described above, according to the optical signal monitoring device 100 and the optical signal monitoring method of the present example embodiment, even when a method of dividing a wavelength band into sub-bands and allocating a different user to each of the sub-bands is employed, safe usage of an optical transmission system can be achieved.

Second Example Embodiment

Figure 5:
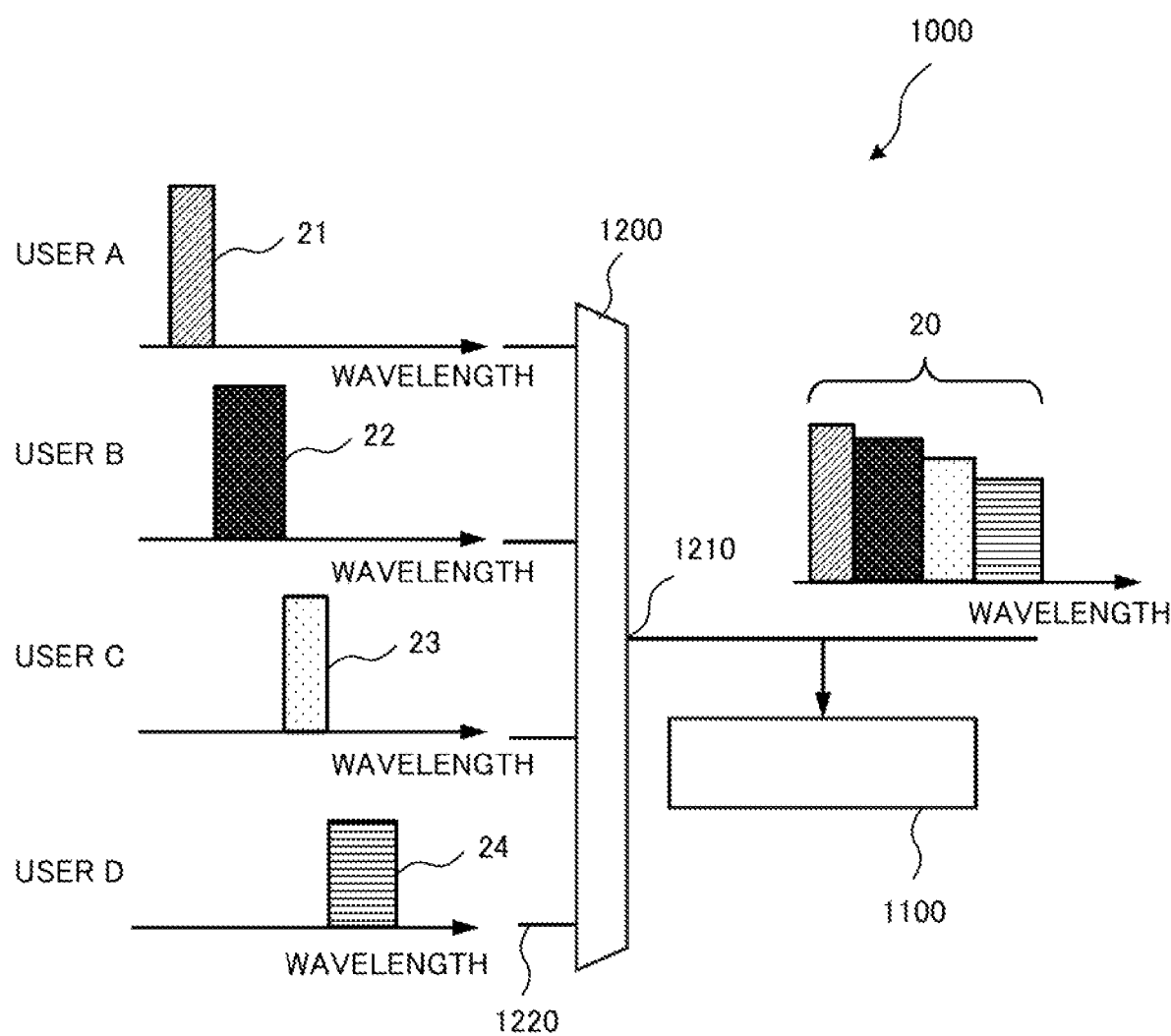
FIG. 5 is a block diagram illustrating a configuration of an optical device according to a second example embodiment of the present invention.

Next, a second example embodiment according to the present invention is described. FIG. 5 illustrates a configuration of an optical device 1000 according to the present example embodiment. The optical device 1000 includes an optical signal monitoring device 1100 and a wavelength switching device 1200.

The optical signal monitoring device 1100 is configured, similarly to the optical signal monitoring device 100 according to the first example embodiment. In other words, when description is made with reference to FIG. 1, the optical signal monitoring device 1100 includes an optical signal information generating unit (optical signal information generating means) 110, a sub-band signal information generating unit (sub-band signal information generating means) 120, and a sub-band signal information control unit (sub-band signal information control means) 130.

The optical signal information generating unit 110 monitors wavelength multiplexed signal light including sub-band optical signals belonging to each of a plurality of sub-bands distinguished by identification information and generates wavelength multiplexed signal information including optical power information in each wavelength of the wavelength multiplexed signal light. The sub-band signal information generating unit 120 generates, based on the wavelength multiplexed signal information, sub-band signal information associated with the identification information with respect to each of the plurality of sub-bands. The sub-band signal information control unit 130 controls, based on the identification information, usage of the sub-band signal information.

The wavelength switching device 1200 includes, as illustrated in FIG. 5, a first connection 1210 configured to input and output wavelength multiplexed signal light 20, and a plurality of second connections 1220 configured to input and output the sub-band optical signals 21 to 24. The wavelength switching device 1200 can be configured, typically, by including a wavelength selectable switch (WSS). The wavelength selectable switch (WSS) includes a function of connecting input wavelength division multiplexed (WDM) signals to output ports with respect to each wavelength.

The optical device 1000 is used in an optical transmission system that allocates a different user to each sub-band. In this case, as illustrated in FIG. 5, sub-band optical signals 21 to 24 of different users (A, B, C, and D) each are input to/output from the optical device 1000 via a plurality of second connections 1220. Users each manage a device (a transponder or the like) that transmits/receives, based on an allocated sub-band, an optical signal. Therefore, users can use transponders manufactured by benders different from each other when the transponders transmit/receive, based on allocated sub-bands, sub-band optical signals 21 to 24.

In an optical transmission system using an optical submarine cable, an open cable method in which first, only an optical cable is constructed and a transponder having an open specification is individually procured has been developed. The optical device 1000 according to the present example embodiment can connect transponders manufactured by different benders, and therefore, can be used as an open cable interface (OCI) device required in such an optical submarine-cable transmission system.

Next, an operation of the optical device 1000 according to the present example embodiment is described.

In an optical transmission system using the optical device 1000, a usage wavelength band of one optical fiber is divided into a plurality of sub-bands and a different user is allocated to each of the sub-bands (spectrum sharing). In the example illustrated in FIG. 5, sub-bands different from each other are allocated to users A, B, C, and D. The user A, the user B. the user C, and the user D transmit/receive a sub-band optical signal 21, a sub-band optical signal 22, a sub-band optical signal 23, a sub-band optical signal 24, respectively.

On a transmission side of the optical transmission system, users each insert each of sub-band optical signals 21 to 24 in a band for an allocated sub-band. The wavelength switching device 1200 included in the optical device 1000 receives, via a plurality of second connections 1220, sub-bands optical signals 21 to 24 and outputs, from the first connection 1210 to a reception side, wavelength multiplexed signal light 20 acquired by multiplexing the sub-bands optical signals 21 to 24. The optical signal monitoring device 1100 monitors wavelength multiplexed signal light 20 branched by an optical coupler or the like.

On the reception side of the optical transmission system, the wavelength switching device 1200 receives, via the first connection 1210, wavelength multiplexed signal light 20 and outputs, from a plurality of second connections 1220, sub-band optical signals 21 to 24 acquired by branching the wavelength multiplexed signal light 20 with respect to each sub-band. Also, on the reception side, the optical signal monitoring device 1100 monitors wavelength multiplexed signal light 20 branched by using an optical coupler or the like.

The optical signal monitoring device 1100 is configured, similarly to the optical signal monitoring device 1000 according to the first example embodiment, in such a way that the sub-band signal information control unit 130 controls, based on identification information, usage of sub-band signal information.

Therefore, according to the optical device 1000 of the present example embodiment, even when a method of dividing a wavelength band into sub-bands and allocating a different user to each of the sub-bands is employed, safe usage of an optical transmission system can be achieved.

The whole or part of the example embodiments disclosed above can be described as, but not limited to, the following supplementary notes.

(Supplementary note 1) An optical signal monitoring device including: an optical signal information generating means for monitoring wavelength multiplexed signal light including sub-band optical signals belonging to each of a plurality of sub-bands distinguished by identification information, and generating wavelength multiplexed signal information including optical power information in each wavelength of the wavelength multiplexed signal light; a sub-band signal information generating means for generating, based on the wavelength multiplexed signal information, sub-band signal information associated with the identification information with respect to each of the plurality of sub-bands; and a sub-band signal information control means for controlling, based on the identification information, usage of the sub-band signal information.

(Supplementary note 2) The optical signal monitoring device according to supplementary note 1, wherein the sub-band signal information control means is configured to respond to a request signal including an identifying code relevant to the identification information, and disclose, to a transmission source of the request signal, the sub-band signal information associated with the identification information.

(Supplementary note 3) The optical signal monitoring device according to supplementary note 1, wherein the sub-band signal information generating means is configured to generate the sub-band signal information associated with the identification information and authentication information, and the sub-band signal information control means is configured to respond to a request signal including an identifying code relevant to the identification information and an authentication code relevant to the authentication information, and disclose, to a transmission source of the request signal, the sub-band signal information associated with the identification information and the authentication information.

(Supplementary note 4) The optical signal monitoring device according to any one of supplementary notes 1 to 3, wherein the sub-band signal information includes at least one of sub-band optical power information relevant to sub-band optical power being optical power of the sub-band optical signal and warning information relevant to a variation in the sub-band optical power.

(Supplementary note 5) The optical signal monitoring device according to supplementary note 4, wherein the sub-band optical power information includes at least one of a sub-band optical spectrum being a distribution of the sub-band optical power with respect to wavelengths, channel optical power being an integrated value of the sub-band optical power in wavelength channels included in the sub-band, and sub-band integration power being an integrated value of the sub-band optical power in respective wavelengths included in the sub-band.

(Supplementary note 6) The optical signal monitoring device according to supplementary note 4 or 5, wherein the warning information includes at least one of channel warning information indicating a variation in channel optical power being an integrated value of the sub-band optical power in wavelength channels included in the sub-band, and sub-band warning information indicating a variation in sub-band integration power being an integrated value of the sub-band optical power in respective wavelengths included in the sub-band.

(Supplementary note 7) An optical device including: the optical signal monitoring device according to any one of supplementary notes 1 to 6; and a wavelength switching device including a first connection configured to input and output the wavelength multiplexed signal light, and a plurality of second connections configured to input and output the sub-band optical signal.

(Supplementary note 8) An optical signal monitoring method including: monitoring wavelength multiplexed signal light including sub-band optical signals belonging to each of a plurality of sub-bands distinguished by identification information; generating wavelength multiplexed signal information including optical power information in each wavelength of the wavelength multiplexed signal light; generating, based on the wavelength multiplexed signal information, sub-band signal information associated with the identification information with respect to each of the plurality of sub-bands; and controlling, based on the identification information, usage of the sub-band signal information.

(Supplementary note 9) The optical signal monitoring method according to supplementary note 8, wherein the controlling usage of the sub-band signal information includes responding to a request signal including an identifying code relevant to the identification information and disclosing, to a transmission source of the request signal, the sub-band signal information associated with the identification information.

(Supplementary note 10) The optical signal monitoring method according to supplementary note 8, wherein the generating the sub-band signal information includes generating the sub-band signal information associated with the identification information and authentication information, and the controlling usage of the sub-band signal information includes responding to a request signal including an identifying code relevant to the identification information and an authentication code relevant to the authentication information, and disclosing, to a transmission source of the request signal, the sub-band signal information associated with the identification information and the authentication information.

(Supplementary note 11) The optical signal monitoring method according to any one of supplementary notes 8 to 10, wherein the sub-band signal information includes at least one of sub-band optical power information relevant to sub-band optical power being optical power of the sub-band optical signal and warning information relevant to a variation in the sub-band optical power.

(Supplementary note 12) The optical signal monitoring method according to supplementary note 11, wherein the sub-band optical power information includes at least one of a sub-band optical spectrum being a distribution of the sub-band optical power with respect to wavelengths, channel optical power being an integrated value of the sub-band optical power in wavelength channels included in the sub-band, and sub-band integration power being an integrated value of the sub-band optical power in respective wavelengths included in the sub-band.

(Supplementary note 13) The optical signal monitoring method according to supplementary note 11 or 12, wherein the warning information includes at least one of channel warning information indicating a variation in channel optical power being an integrated value of the sub-band optical power in wavelength channels included in the sub-band, and sub-band warning information indicating a variation in sub-band integration power being an integrated value of the sub-band optical power in respective wavelengths included in the sub-band.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100 Optical signal monitoring device
110 Optical signal information generating unit 120 Sub-band signal information generating unit
130 Sub-band signal information control unit
1000 Optical device
1100 Optical signal monitoring device
1200 Wavelength switching device
1210 First connection
1220 Second connection

What is claimed is:

1. An optical signal monitoring device comprising:
an optical signal information generator configured to monitor wavelength multiplexed signal light including sub-band optical signals belonging to each of a plurality of sub-bands distinguished by identification information, and generate wavelength multiplexed signal information including optical power information in each wavelength of the wavelength multiplexed signal light;
a sub-band signal information generator configured to generate, based on the wavelength multiplexed signal information, sub-band signal information associated with the identification information with respect to each of the plurality of sub-bands; and
a sub-band signal information controller configured to:
control, based on the identification information, usage of the sub-band signal information, and
disclose, to a transmission source of a request signal, the sub-band signal information in response to the request signal,
wherein the sub-band signal information includes at least one of:
sub-band optical power information relevant to sub-band optical power being optical power of the sub-band optical signal, and
warning information relevant to a variation in the sub-band optical power.

2. The optical signal monitoring device according to claim 1, wherein
the sub-band signal information controller is configured to respond to the request signal including an identifying code relevant to the identification information, and disclose, to the transmission source of the request signal, the sub-band signal information associated with the identification information.

3. The optical signal monitoring device according to claim 1, wherein
the sub-band signal information generator is configured to generate the sub-band signal information associated with the identification information and authentication information, and
the sub-band signal information controller is configured to respond to the request signal including an identifying code relevant to the identification information and an authentication code relevant to the authentication information, and disclose, to the transmission source of the request signal, the sub-band signal information associated with the identification information and the authentication information.

4. The optical signal monitoring device according to claim 1, wherein
the sub-band optical power information includes at least one of a sub-band optical spectrum being a distribution of the sub-band optical power with respect to wavelengths, channel optical power being an integrated value of the sub-band optical power in wavelength channels included in the sub-band, and sub-band integration power being an integrated value of the sub-band optical power in respective wavelengths included in the sub-band.

5. The optical signal monitoring device according to claim 4, wherein
the warning information includes at least one of channel warning information indicating a variation in channel optical power being an integrated value of the sub-band optical power in wavelength channels included in the sub-band, and sub-band warning information indicating a variation in sub-band integration power being an integrated value of the sub-band optical power in respective wavelengths included in the sub-band.

6. The optical signal monitoring device according to claim 1, wherein
the warning information includes at least one of channel warning information indicating a variation in channel optical power being an integrated value of the sub-band optical power in wavelength channels included in the sub-band, and sub-band warning information indicating a variation in sub-band integration power being an integrated value of the sub-band optical power in respective wavelengths included in the sub-band.

7. An optical device comprising:
an optical signal monitor; and
a wavelength switch,
wherein the optical signal monitor includes:
an optical signal information generator configured to monitor wavelength multiplexed signal light including sub-band optical signals belonging to each of a plurality of sub-bands distinguished by identification information, and generate wavelength multiplexed signal information including optical power information in each wavelength of the wavelength multiplexed signal light,
a sub-band signal information generator configured to generate, based on the wavelength multiplexed signal information, sub-band signal information associated with the identification information with respect to each of the plurality of sub-bands, and
a sub-band signal information controller configured to:
control, based on the identification information, usage of the sub-band signal information, and
disclose, to a transmission source of a request signal, the sub-band signal information in response to the request signal,
wherein the wavelength switch includes a first connection configured to input and output the wavelength multiplexed signal light, and a plurality of second connections configured to input and output the sub-band optical signal, and
wherein the sub-band signal information includes at least one of:
sub-band optical power information relevant to sub-band optical power being optical power of the sub-band optical signal, and
warning information relevant to a variation in the sub-band optical power.

8. The optical device according to claim 7, wherein
the sub-band signal information controller is configured to respond to the request signal including an identifying code relevant to the identification information, and disclose, to the transmission source of the request signal, the sub-band signal information associated with the identification information.

9. An optical signal monitoring method comprising:
monitoring wavelength multiplexed signal light including sub-band optical signals belonging to each of a plurality of sub-bands distinguished by identification information;
generating wavelength multiplexed signal information including optical power information in each wavelength of the wavelength multiplexed signal light;
generating, based on the wavelength multiplexed signal information, sub-band signal information associated with the identification information with respect to each of the plurality of sub-bands;
controlling, based on the identification information, usage of the sub-band signal information; and
disclosing, to a transmission source of a request signal, the sub-band signal information in response to the request signal,
wherein the sub-band signal information includes at least one of:
sub-band optical power information relevant to sub-band optical power being optical power of the sub-band optical signal, and
warning information relevant to a variation in the sub-band optical power.

10. The optical signal monitoring method according to claim 9, wherein
the controlling usage of the sub-band signal information includes responding to the request signal including an identifying code relevant to the identification information and disclosing, to the transmission source of the request signal, the sub-band signal information associated with the identification information.

11. The optical signal monitoring method according to claim 9, wherein
the generating the sub-band signal information includes generating the sub-band signal information associated with the identification information and authentication information, and
the controlling usage of the sub-band signal information includes responding to the request signal including an identifying code relevant to the identification information and an authentication code relevant to the authentication information, and disclosing, to the transmission source of the request signal, the sub-band signal information associated with the identification information and the authentication information.

12. The optical signal monitoring method according to claim 9, wherein
the sub-band optical power information includes at least one of a sub-band optical spectrum being a distribution of the sub-band optical power with respect to wavelengths, channel optical power being an integrated value of the sub-band optical power in wavelength channels included in the sub-band, and sub-band integration power being an integrated value of the sub-band optical power in respective wavelengths included in the sub-band.

13. The optical signal monitoring method according to claim 12, wherein
the warning information includes at least one of channel warning information indicating a variation in channel optical power being an integrated value of the sub-band optical power in wavelength channels included in the sub-band, and sub-band warning information indicating a variation in sub-band integration power being an integrated value of the sub-band optical power in respective wavelengths included in the sub-band.

14. The optical signal monitoring method according to claim 9, wherein
the warning information includes at least one of channel warning information indicating a variation in channel optical power being an integrated value of the sub-band optical power in wavelength channels included in the sub-band, and sub-band warning information indicating a variation in sub-band integration power being an integrated value of the sub-band optical power in respective wavelengths included in the sub-band.

* * * * *